United States Patent [19]
Harper et al.

[11] Patent Number: 5,984,592
[45] Date of Patent: *Nov. 16, 1999

[54] ROTARY CUTTING TOOLS

[75] Inventors: Clive Harper, Chester; John Yates, Worcestershire, both of United Kingdom

[73] Assignee: Sandvik AB, Sanviken, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/769,447

[22] Filed: Dec. 19, 1996

[30] Foreign Application Priority Data

Dec. 21, 1995 [GB] United Kingdom ................... 9526197
Nov. 6, 1996 [GB] United Kingdom ................... 9623170

[51] Int. Cl.$^6$ ..................................................... B23B 51/04
[52] U.S. Cl. .................................. 407/40; 407/34; 407/61
[58] Field of Search ................................. 407/34, 40, 42, 407/48, 51, 53, 56, 61

[56] References Cited

U.S. PATENT DOCUMENTS

| | | | |
|---|---|---|---|
| 3,733,665 | 5/1973 | Spriggs | 407/34 |
| 4,789,273 | 12/1988 | Wiacek et al. | 407/34 |
| 4,993,891 | 2/1991 | Kaminiski et al. | 407/61 |
| 4,995,767 | 2/1991 | Segal | 407/34 |

FOREIGN PATENT DOCUMENTS

| | | |
|---|---|---|
| 0066 079 | 12/1982 | European Pat. Off. . |
| 0089545 | 9/1983 | European Pat. Off. . |
| 2 190 863 | 12/1987 | United Kingdom . |

OTHER PUBLICATIONS

GB Search Report dated Feb. 20, 1996.

*Primary Examiner*—Daniel W. Howell
*Assistant Examiner*—Mark Williams
*Attorney, Agent, or Firm*—Burns, Doane, Swecker & Mathis, L.L.P.

[57] ABSTRACT

A routing cutter has a tool body carrying replaceable cutting inserts which include side inserts with cutting edges projecting radially from the periphery of the body and end inserts with cutting edges projecting forwards from the body. The cutting edges of the side inserts have inward extensions to define a cutting envelope that intersects or overlaps the cutting envelope of the end inserts. Each side insert is secured by clamping screws extending substantially radially into the tool body, rearwards of the insert cutting edge. This arrangement of the clamping screws allows the body to be formed with relatively shallow seating recesses for the side inserts with substantially tangential locating faces against which the inserts are clamped for precise radial location. Also, the side inserts can be relatively deep in the direction of rotation to improve support for cutting edge regions that project from the tool body.

12 Claims, 3 Drawing Sheets

ROTARY CUTTING TOOLS

BACKGROUND OF THE INVENTION

This invention relates to rotary cutting tools such as routing cutters and end mills, intended to be used to machine slots and/or recesses in a workpiece.

GB 2186220 shows a routing tool in which, typically, a pair of cutter blades are mounted at diametrically opposed positions of a rotary body in flutes formed in the sides of the body, each blade having a cutting edge that extends along the flute over its radially outer edge and continues inwards and rearwards over end portions of the blades that project forwards from the axial end of the tool body. In a routing operation in which the cutter moves along the workpiece in a direction perpendicular to its rotary axis, only the radially outer cutting edge is employed. The inward and rearward continuation of the cutting edge at the end of the tool body is necessary to permit the tool to be given an axial feed movement into the workpiece at the same time as it moves along the workpiece. During such a ramping movement the end portions of the blades then act to remove a core of material that is left projecting above the instantaneous depth reached by the outer part of the cutting edge.

For this reason, routing cutters and like rotary tools which are required to perform a ramping motion have relatively large and complex cutter blades and the cost of production is consequently relatively high even if, as in the example already mentioned, the cutter blades are formed separately from the body of the tool.

SUMMARY OF THE INVENTION

According to one aspect of the present invention a routing cutter is provided comprising a rotatable body having a plurality of cutting inserts, said inserts comprising at least one side insert providing a cutting edge that projects radially from the peripheral region of the body, and at least one end insert that projects from a forward axial end region of the body and that has a cutting edge inclined radially inwardly and rearwardly of the body, said two inserts being located in positions that are angularly spaced about a central rotary axis of the body and describing cutting envelopes that intersect or overlap in the rotation of the body about said axis, said at least one side insert being secured to the cutter body by clamping means that extend inwardly through a radially outer face of the insert rearwardly of its cutting edge.

Preferably there are at least two of each of said inserts, symmetrically spaced about the central axis of the body and in corresponding axial and radial positions.

The cutting inserts may conveniently be in the form of replaceable inserts and in the application of the invention it is possible to arrange that the inserts are held against respective faces of the cutter body that lie at least approximately tangential to their direction of rotation, thereby to fix them more securely.

In the angular spacing of the respective cutting inserts of said plurality of inserts, preferably a flute or other radially outer recess in the tool body lies between successively spaced inserts.

It is also preferred to provide said at least one side cutting insert with a cutting edge that acts over a radially outer region of the forward axial end of the cutter body. Continuing from the radially inner end, said end cutting edge of the insert may have a rearwardly directed edge having an envelope of rotation which overlaps with the envelope of rotation of a cutting edge of said at least one end insert.

The inserts may be of elongate form with a substantially uniform cross-section, said at least one side insert having its longitudinal axis parallel to the rotary axis of the tool and said at least one end insert having its longitudinal axis inclined obliquely upwards toward the centre of the tool.

According to another aspect of the invention, there is provided a cutter comprising a tool body rotatable about a longitudinal axis and carrying at least one group of at least two replaceable cutting inserts, a first insert of the or each said group at the outer periphery of the body having a cutting edge that projects radially and axially of the body, said first insert being secured to the tool body by clamping means extending inwardly into said body from an aperture in the insert spaced rearwardly from a leading face of the insert, said first insert projecting radially outwardly further than a second insert of the group at the forward end of the body, said second insert having a cutting edge that projects forwardly from the body and is inclined rearwardly towards the axis of rotation, said second insert extending radially inwards beyond said first insert cutting edge, said first and second inserts of the or each group being angularly spaced from each other with respect to the axis of rotation of the tool.

An example of a tool according to the invention is illustrated in the accompanying drawings.

DESCRIPTION OF THE PREFERRED EMBODIMENT

Figure 1:
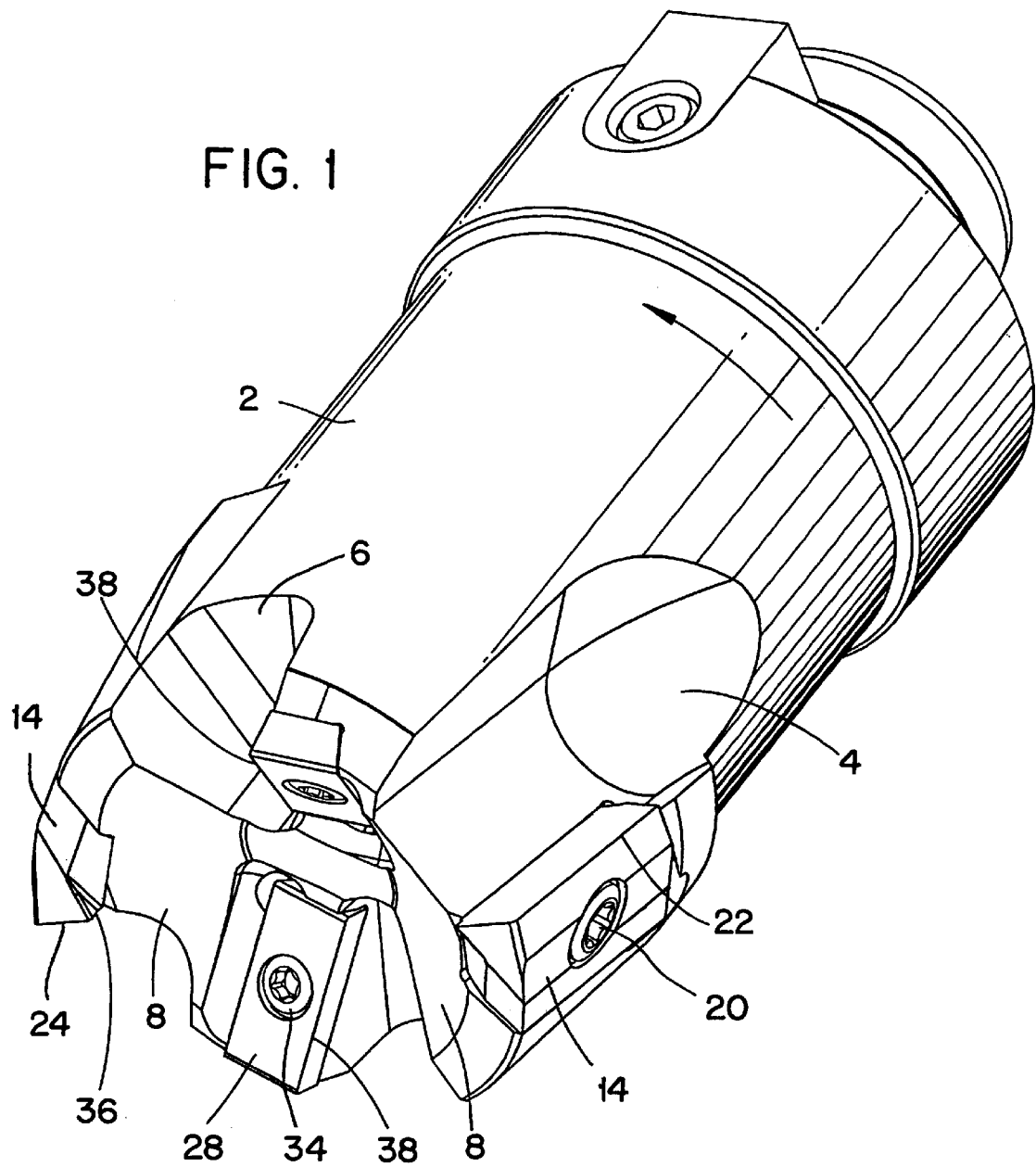
FIGS. 1 and 2 are oblique views of a routing cutter according to the invention, the cutting inserts of the tool being absent in FIG. 2.
Figure 2:
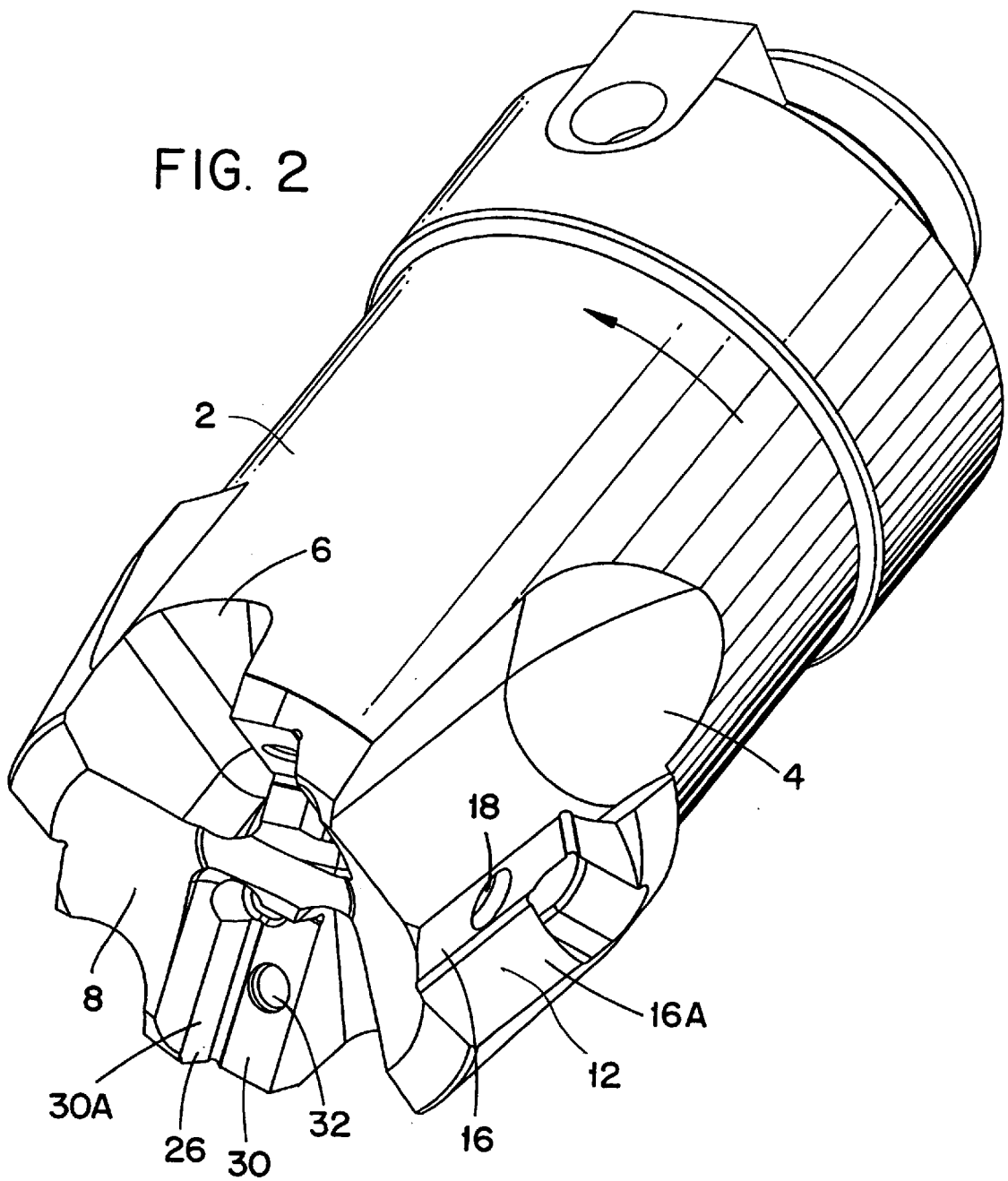
Figure 3:
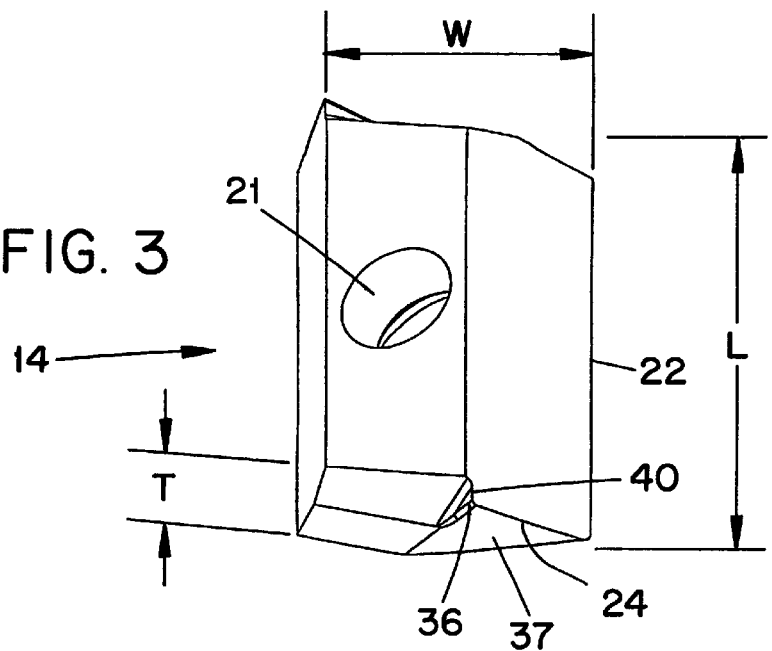
FIG. 3 is an oblique view to a larger scale of one of the inserts of the cutter.

Referring to the drawings, the routing cutter is symmetrical about a central axis on which it rotates in the arrowed direction and comprises a generally cylindrical body 2 having a pair of diametrically opposed flutes 4 extending rearwards from a forward end of the body. A diametrically opposed pair of shorter hollows 6 are formed in the forward end of the body, between the flutes 4. The flutes and hollows may be directed axially or helically to the rotary axis. Between the flutes 4 and hollows 6 the forward end of the body is formed by facets 8 that are inclined axially rearwards from their radially outward ends.

At the outer side region of the trailing face of each flute a recess provides a seating or pocket 12 for an elongate first cutting insert 14 of generally uniform cross-section which projects from the periphery of the body and also from its forward end. The seating 12 includes a circumferentially forwardly facing bearing face 16A. The bottom or inner face 16 of the seating lies substantially tangentially to the direction of rotation of the cutter and has a tapped hole 18 extending substantially radially into the body to receive a clamping screw 20 passing through bore 21 in the insert. The insert thus secured against the face 16 on the body can have a considerable thickness in the circumferential direction, so that adequate support can be provided for the cutting edge even if a cutting edge profile is chosen that results in the insert projecting further than shown from the body. At the same time, the insert can be kept compact in the radial direction so that the seating recesses 12 can be relatively shallow, limiting their effect on the strength of the body.

The insert 14 has an axially extending length dimension L, a circumferentially (or tangentially) extending width dimension W, and a radially extending thickness dimension T which is shorter than each of the dimensions L and W. The peripheral insert 14 is secured in the seating with its major axis C and an outer cutting edge 22 parallel to the body rotary axis. The cutting edge 22 extends the length of the insert and at the projecting forward end of the insert it joins a radial end cutting edge 24 running at right-angles to it, the cutting edges 22,24 defining the leading face of the insert. At the inner corner of the edge 24 a stepped recess is formed with an axially extending clearance face 36 having chamfers at its upper and lower edges. The clearance face 37 extending from the cutting edge 24 is inclined rearwardly therefrom.

At the trailing face of each hollow 6 there is a further recess in the leading end of the body providing a seating or pocket 26 for a second uniform cross-section cutting insert 28. The seating 26 includes a circumferentially forwardly facing bearing face 30A. The bottom or inner face 30 of the seating 26 has a tapped hole 32 for the insert clamping screw 34. The second insert 28 is also elongate and is essentially rectangular in form. The insert 28 has longer cutting edge 38 spaced forwards from the tool body and inclined axially rearwardly from its radially outer end to define an obliquely inclined major axis D. As can best be seen in FIG. 4, the radially outer end of the second insert cutting edge 38 lies at a greater radius than the inner radius of the end cutting edge 24 of the first insert. The second insert cutting edge 38 also continues radially inwards further than the edge 24 of the first insert.

The radially outer end of the end element cutting edge 38 does not project forwards of the outer element cutting edge 24, and can lie slightly behind it. The stepped recess formed in the outer element with the axial face 36 allows the tool to be fed axially into the workpiece without interference from the inner region of the insert 14. The paths of rotation of the end element cutting edge 38 and the radially outer edge of the recess about the tool longitudinal axis intersect each other. That recess forms a rearwardly directed cutting edge portion 40 which extends from a radially inner end of the cutting edge 24.

Figure 4:
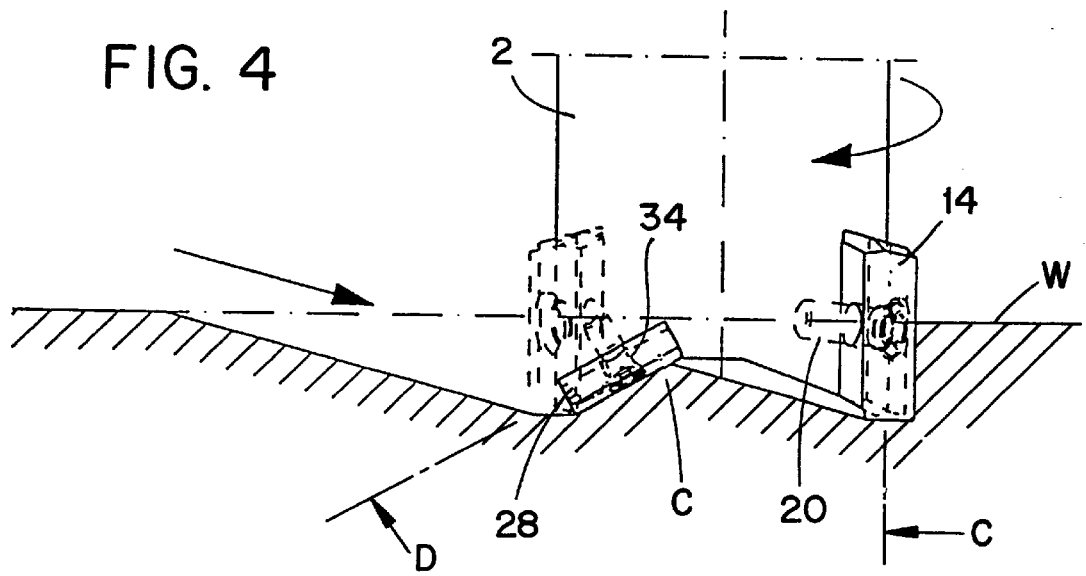
FIG. 4 is a diagrammatic view of the routing cutter illustrating its cutting action.

The two inserts 14,28 act in a complementary manner in that when they rotate about the tool axis they describe cutting envelopes that intersect or overlap. The inserts can therefore cut a recess in the same manner as a unitary routing cutting edge of the kind shown in GB 2186220. FIG. 4 illustrates how, when the routing cutter is being fed obliquely into a workpiece W, it cuts a ramped recess. The first outer cutting inserts 14 leave an upstanding core or "cherry" C as the cutter advances into the material, the size of which depends upon the angle of feed of the cutter. This is removed by the end inserts 28 as the tool moves across the workpiece in a routing operation. By staggering the angular positions of the side and end inserts, it is possible to obtain the overlap of their cutting envelopes to give this result. It will be noted that each cutting insert 14,28 is associated with a respective flute 4 or hollow 6, providing a passage for the escape of the cuttings from that insert.

The arrangement of separate inserts allows smaller size cutter elements to be used, which is more economical, in particular if the inserts are arranged to be indexable, as the illustrated inserts are by rotation through 180°. Both inserts are reversible to present alternative cutting edges for an extended working life. It is also possible within the scope of the invention to employ permanently fixed, eg. brazed inserts. Furthermore, by employing multiple cutting inserts, it is also possible to select different materials for the inserts so as to optimise their operation under different conditions, in particular to allow for the slower cutting speed at which the axial end inserts operate.

Another advantage of the illustrated arrangement of the inserts is that because each insert is clamped against a face that is substantially tangential to the direction of rotation it can be secured in a precise manner that facilitates the rotational balancing of the tool, a factor of some importance for the high-speed routing of light alloys.

We claim:

1. A routing cutter comprising:
   a body rotatable in a direction of rotation about a central axis and defining a radius extending from the axis;
   said body extending axially and having a forwardly facing axial end region;
   a radially outer peripheral region of the body extending axially rearwardly from said axial end region;
   at least one first mounting pocket disposed in said outer peripheral region;
   at least one second mounting pocket disposed in said axial end region;
   a plurality of cutting inserts mounted on the body, and comprising:
   at least one peripheral insert secured in said at least one first mounting pocket and having a peripheral cutting edge that projects radially outwardly past said outer peripheral region, and
   at least one end insert secured in said at least one second mounting pocket and having an end cutting edge that projects forwardly from said forward axial end region;
   said end cutting edge having a radially outer end and extending radially inwardly and axially rearwardly from said radially outer end;
   said at least one peripheral insert and said at least one end insert being mutually angularly spaced about the central axis of the body;
   said end cutting edge and said peripheral cutting edge describing respective cutting envelopes that intersect one another during rotation of the body about said axis;
   said at least one peripheral insert having a radially outwardly facing outer face disposed rearwardly of its associated peripheral cutting edge with reference to the direction of rotation of the body, said at least one peripheral insert having a substantially axially extending length dimension, a substantially circumferentially extending width dimension, and a substantially radially extending thickness dimension which is smaller than each of said length and width dimensions; and
   a clamping member securing said peripheral insert to said body and extending into said body through said outer face and through said thickness dimension of said at least one peripheral insert.

2. A cutter according to claim 1 wherein said peripheral cutting edge comprises a cutting edge portion that acts over a radially extending outer zone of said forwardly facing axial end region.

3. A cutter according to claim 2 wherein said peripheral cutting edge includes an outer cutting edge portion extending parallel to the central axis, a radial cutting edge portion extending radially inwardly from the outer cutting edge portion, and a rearwardly directed cutting edge portion extending rearwardly from a radially inner end of the radial cutting edge portion, wherein respective envelopes of rotation about the center axis of said end cutting edge and said rearwardly directed cutting edge, about the center axis, overlap each other.

4. A cutter according to claim 1 wherein said at least one first mounting pocket includes a radially outwardly facing bearing face into which the clamping member is secured.

5. A cutter according to claim 4 wherein said at least one first mounting pocket further includes a circumferentially forwardly facing face against which the peripheral insert bears.

6. A cutter according to claim 5 wherein said at least one second mounting pocket includes an axially forwardly facing bearing face, and a circumferentially forwardly facing bearing face, said at least one end insert bearing against axially forwardly facing bearing face and said circumferentially forwardly facing bearing face of said at least one second mounting pocket.

7. A cutter according to claim 1 wherein each of said at least one peripheral insert and said at least one end insert is indexible to present alternative cutting edges.

8. A cutter according to claim 1 wherein said at least one peripheral insert defines a major axis extending parallel to said central axis and has substantially uniform cross sections taken perpendicular to its longitudinal insert axis; said at least one end insert defining a major axis inclined obliquely relative to said center axis and having substantially uniform cross sections taken perpendicular to its longitudinal insert axis.

9. A cutter according to claim 1 wherein said at least one peripheral insert comprises a plurality of said peripheral inserts equiangularly spaced about said central axis.

10. A cutter comprising:
    a body rotatable in a direction of rotation about a central longitudinal axis and defining a radius extending from the axis;
    at least one group of at least two replaceable cutting inserts carried on the body;
    the cutter body comprising an outer periphery in which a first insert of said at least one group is mounted;
    said first insert having a circumferentially facing leading face and a radially outwardly facing outer face, said first insert having a substantially axially extending length dimension, a substantially circumferentially extending width dimension, and a substantially radially extending thickness dimension which is smaller than each of said length and width dimensions;
    the leading face having a first cutting edge that projects radially outwardly and axially forwardly of the body;
    an aperture disposed in said outer face and spaced rearwardly from the leading face with reference to the direction of rotation of said body;
    a clamp member extending inwardly into the body through said aperture and through said thickness dimension of said first insert;
    the tool body further comprising an axially forwardly facing end in which a second insert of said at least one group of inserts is mounted;
    said second insert including a second cutting edge having a radially outer end disposed radially inwards of said first cutting edge;
    said second cutting edge projecting axially forwardly from said tool body and being inclined rearwardly from said radially outer end toward said axis of rotation;
    said first and second inserts being angularly spaced from each other about said axis of rotation.

11. A cutter according to claim 10 wherein said at least one group comprises a plurality of said groups disposed in a rotationally symmetrical arrangement about said central axis.

12. A cutter comprising a body rotatable in a direction of rotation about a central longitudinal axis and defining a radius extending from the axis, the body carrying at least one group of at least two replaceable cutting inserts;
    said body being axially elongate between respective forward and rearward axial end regions thereof and having a radially outer peripheral region extending axially rearwardly from said forward axial end region of said body;
    a first insert of said at least one group being mounted in said radially outer region and having a first cutting edge projecting radially outwardly of said body and a radially outwardly facing outer face extending rearwardly from said first cutting edge with reference to the direction of rotation of said body, said first insert having a substantially axially extending length dimension, a substantially circumferentially extending width dimension, and a substantially radially extending thickness dimension which is smaller than each of said length and width dimensions;
    a first seating disposed in said outer peripheral region for receiving said first insert, said first seating having a radially outwardly directed first seating face against which said first insert is clamped;
    a threaded first aperture disposed in said first seating face and a first clamping screw threadedly engageable in said first aperture;
    a second aperture formed in said outer face of said first insert and extending through said thickness dimension of said first insert for receiving said first clamping screw, said first clamping screw passing through said second aperture and being engaged in said first threaded aperture to clamp said first insert against said first seating face;
    a second seating disposed in said forward axial end region for receiving a second insert of said at least one group;
    said second insert having a second cutting edge projecting axially forwardly of said tool body and an end face extending rearwardly from said cutting edge with reference to the direction of rotation;
    said second insert seating having an axially forwardly facing face disposed oblique to the axis of rotation, the second insert being clamped against said forwardly facing face;
    a threaded third aperture in said forwardly facing face and a second clamping screw threadedly engageable in said third aperture;
    a fourth aperture formed in said end face of said second insert and extending through a thickness dimension of said second insert for receiving said second clamping screw, said second clamping screw extending through said fourth aperture and being threadedly engaged in said third aperture to clamp said second insert against said forwardly facing face;
    said second cutting edge having a radially outermost end thereof lying radially inwardly of said first cutting edge;
    said second cutting edge extending from said radially outermost end in a direction inclined axially rearwardly and towards said axis of rotation;
    said first and second cutting edges describing respective cutting envelopes during rotation of said body about said axis, said cutting envelopes intersecting one another; and
    said first and second inserts being angularly spaced from each other about said axis of rotation.

* * * * *